(12) United States Patent  
Kurashige (10) Patent No.: US 6,219,459 B1
(45) Date of Patent: *Apr. 17, 2001

(54) IMAGE TRANSFORM DEVICE FOR TRANSFORMING A PICTURE IMAGE TO A PAINTING-TYPE IMAGE

(75) Inventor: Masafumi Kurashige, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/116,754

(22) Filed: Jul. 15, 1998

Related U.S. Application Data

(62) Division of application No. 08/743,938, filed on Nov. 5, 1996, now Pat. No. 6,088,487.

(30) Foreign Application Priority Data

Nov. 11, 1995 (JP) ................................. 7-317377

(51) Int. Cl.$^7$ ..................................... G06K 9/40
(52) U.S. Cl. .................... 382/266; 382/199; 382/284
(58) Field of Search ...................... 382/199, 266, 382/284; 345/114, 435, 153; 358/519, 540, 450, 465, 466; 348/674, 684, 659, 584, 585, 586, 590, 591, 592, 598, 599, 625, 630, 631, 673

(56) References Cited

U.S. PATENT DOCUMENTS

| 4,704,605 | * | 11/1987 | Edelson ................................. 345/435 |
| 4,947,255 | * | 8/1990 | Jackson et al. ....................... 358/183 |
| 5,231,677 | * | 7/1993 | Mita et al. ........................... 382/266 |
| 5,543,820 | * | 8/1996 | Edgar .................................. 358/519 |

* cited by examiner

*Primary Examiner*—Amelia Au
*Assistant Examiner*—Timothy M. Johnson
(74) *Attorney, Agent, or Firm*—Frommer Lawrence & Haug, LLP.; William A. Frommer; Dennis M Smid (57) ABSTRACT

A low cost image transform device capable of converting an input image to the linear drawing style in real time is presented. An edge signal of the input image is detected and normalized. The normalized edge signal is then non-linear transformed to decrease the intermediate tone level of the edges so that lines can be seen more clearly. Inversion control is further used to reverse the lightness and darkness of the non-linear transformed edge signal. The inverted signal is subsequently level adjusted and then mixed with a delayed version of the input signal using an externally controlled ratio signal. The resulting output signal is a drawing or painting type image. Since these processes are executed by simple addition or multiplication, the linear drawing style image is obtained in real time, in which edges having high-light and shaded contrast are extracted from the input image.

3 Claims, 10 Drawing Sheets

IMAGE TRANSFORM DEVICE FOR TRANSFORMING A PICTURE IMAGE TO A PAINTING-TYPE IMAGE

CROSS REFERENCE TO RELATED APPLICATION

This application is a division of application Ser. No. 08/743,938, filed Nov. 5, 1996, now U.S. Pat. No. 6,088,487.

BACKGROUND OF THE INVENTION

1. Field of the Invention

The present invention relates to an image transforming device and more particularly to an improvement of the device for transforming an original picture image to such as a drawing type image and a painting type image.

2. Description of the Related Art

Almost all structural characteristics contained in an image can be grasped as a linear characteristic of the edge part of contour and boundary of the object contained. And the drawings expressed by grasping the image as the linear characteristic can give a strong impression on the viewer as well as giving psychological effects on him. Accordingly, linearization of the image has been used as a method to show special effects in the video field.

Furthermore, even though pictures such as crayon drawings and oil paintings are just colored linear pictures, they have artistic beauties and special flavors of their own.

Heretofore, these linear drawings and paintings have been made by the man's handwork and regarded unsuitable to be made with the aid of the mechanical means such as computer.

Moreover, in general, an animated cartoon consists of a number of lines and pictures drawn with the lapse of time and made by many peoples' handworks.

However, it requires much labor and time for making the linear drawing and painting by means of the human handwork, and the method to realize these works easily has been desired. Then our company has been proposed an image data processing device which is shown in U.S. Pat. No. 5,101,440.

SUMMARY OF THE INVENTION

An object of the present invention is to provide an image transforming device which is capable of transforming the original image to linear drawings and paintings in real time and adjusting more detailed than the apparatus shown in U.S. Pat. No. 5,101,440.

The foregoing objects and other objects of the invention have been achieved by the provision of an image transforming device in which an edge signal of inputted image detected by the edge detecting means is normalized by normalization means and two signals will be mixed making the nonlinear transformed edge signal as the key signal in order to decrease intermediate tone elements. Since these processings can be realized by simple processing such as multiplication and addition, drawing type images extracted only the edges having large light and shade contrast in the inputted images can be obtained real time.

The nature, principle and utility of the invention will become more apparent from the following detailed description when read in conjunction with the accompanying in which like parts are designated by like reference numerals or characters.

DETAILED DESCRIPTION OF THE EMBODIMENT

Preferred embodiment of the present invention will be described with reference to the accompanying drawings:

(1) First Embodiment

Figure 1:
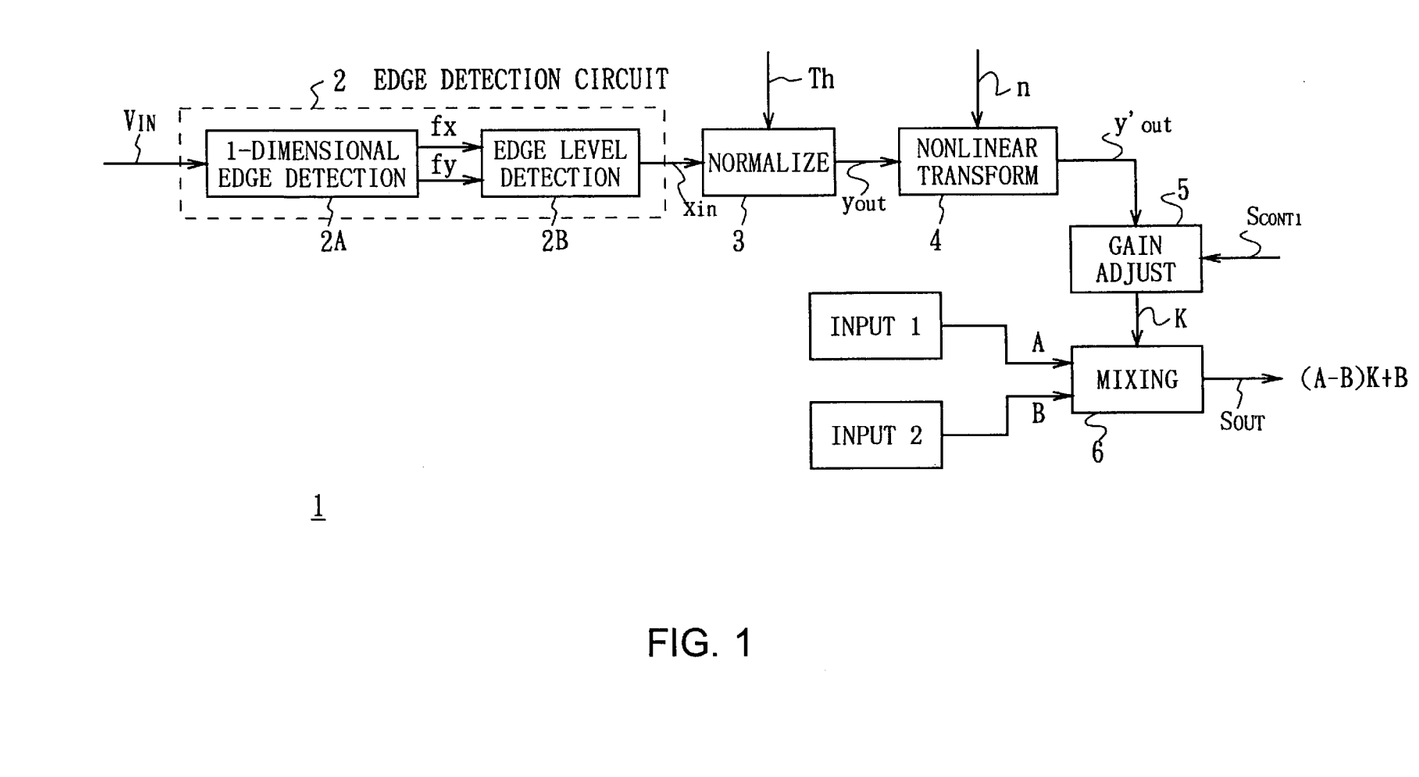
FIG. 1 is a block diagram showing one embodiment of the image transforming device according to the present invention.

FIG. 1 shows an example of the construction of image transforming device suited for the use in case of transforming an original image to the drawing. Each part of the image transforming device 1 is constructed as follows:

An edge detection circuit 2 is a circuit which receives an input image signal $V_{IN}$ to of an input image f and detects its edge. Here, the edge detection circuit 2 utilizes the characteristic that the edge which human can recognize is the localized region where light and gray level change rapidly. More specifically, it will be detected by using the brightness differential value.

The edge detection circuit 2 differentiates the inputted image in the horizontal direction (x direction) and in the vertical direction (y direction) at a one-dimensional edge detection circuit 2A. In the figure the differential in the x direction is shown by fx and the differential in the y direction is shown by fy.

Furthermore, in the digital image processing assisted by the computer, since the calculation process becomes complicated if the differential calculation is used, in practice the difference calculation will be used in place of the differential. As an example of this, the operator of Abel will be shown in the following EQUATION:

$$fx = \begin{pmatrix} -1 & 0 & 1 \\ -2 & 0 & 2 \\ -1 & 0 & 1 \end{pmatrix} fy = \begin{pmatrix} -1 & -2 & -1 \\ 0 & 0 & 0 \\ 1 & 2 & 1 \end{pmatrix} \quad (1)$$

where each coefficient is the coefficient to apply to 3×3 picture element.

An edge level detection circuit 2B inputs the calculation result by the operator and obtains the primary differential value E based on the following Equation:

$$E = \sqrt{(fx^2 + fy^2)} \tag{2}$$

The size of the primary differential E takes the large value at the region where the lightness change is large while it takes the smaller value at the part where the lightness change is even. As a result, the part of rapid change in light and gray level in the input image f becomes clear.

A normalization circuit 3 is a circuit to extract the part which is regarded as the line in the edge obtained from the input image f. At this point, the threshold value Th giving the level which is regard as the line can be set arbitrary and will be given externally to the normalization circuit 3. The normalization circuit 3 conducts the following calculation based on said threshold value Th:

$$y_{out} = x_{in}/Th \ (Th > X_{in} \geq 0) \ y_{out} = 1 \ (x_{in} \geq Th) \tag{3}$$

and of edges obtained by the input image f, the values of the part exceeding the threshold value Th will be saturated with "1".

A nonlinear transform circuit 4 is a circuit to make the line to be seen more clearly by decreasing edges of the intermediate level which are closed to the level regarded as the line by the normalization process, and transforms the distribution of the signal level based on the transform curve given by the following Equation:

$$y'_{out} = (y_{out})^n \ (\text{where } n > 1) \tag{4}$$

Figure 2:
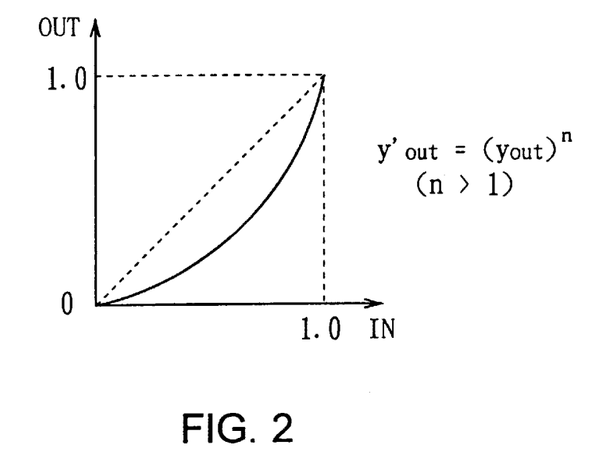
FIG. 2 is a characteristic curvilinear diagram showing the nonlinear transform characteristics.

In this connection, the nonlinear transform curve will be shown in FIG. 2.

A gain adjustment circuit 5 is a circuit to increase and decrease the amplitude of the drawing information $y'_{out}$ nonlinear transformed based on the control signal $S_{CONT1}$ and the darkness of the line forming the drawing can be adjusted by this amplitude control. For example, at the gain adjustment circuit 5, if the gain becomes smaller, the line can become lighter while the gain becomes bigger, the line can become darker. The signal after the amplitude converted will be given to a mixing circuit 6 as a key signal K.

The mixing circuit 6 is a circuit to mix the first and second input signals A and B based on the key signal K according to the following Equation and to output the resultant signal.

$$S_{out} = (A-B) \cdot K + B \tag{5}$$

At this point, the whole faces of the first and second input signals A and B may be colored with single color, or one of them may be color signal of the line giving the drawing and the other may be the image signal to become the background image. For example, if a picture on the canvas is inputted as the second input signal B, an image having a touch of reality like drawing the drawing on the canvas can be obtained from the output of the mixing circuit 6.

Figure 3:
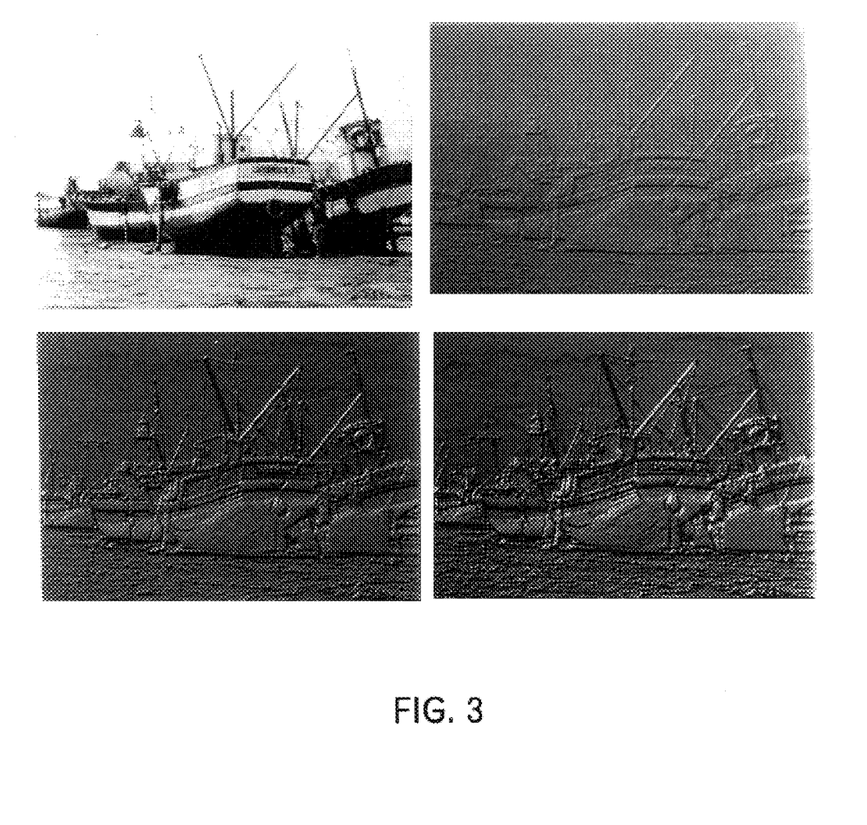
FIG. 3 is pictures showing an input image and images after linear transformed.

An example of the image transform processing according to the image transforming device 1 will be described in the following paragraphs referring to the construction described above. At this point, supposing that the image of the left upper part in FIG. 3 is inputted to the edge detection device as the input image f and white and gray colors are inputted as the first and second input signals A and B respectively.

Figure 4:
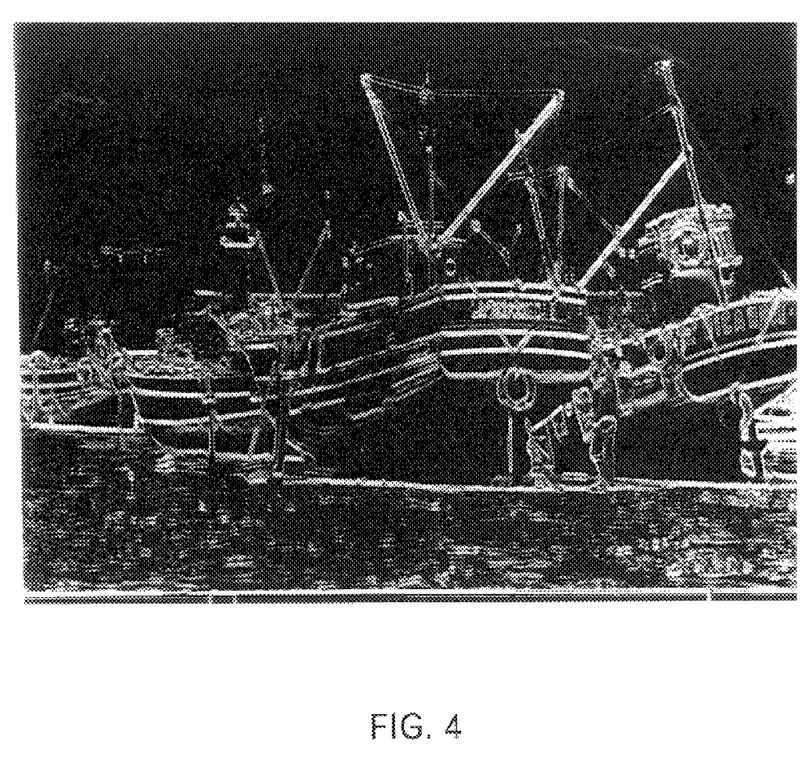
FIG. 4 is a picture showing an image after linear drawing transformed.

The image transform device 1 obtains the key signal K from the input image f from which the edge part having rapid lightness change is extracted (i.e., only the basic line forming the subject) containing various edges on the whole screen and outputs the image like putting the white color drawing (the first input signal A) over the gray foundation (the second input signal B) from the output terminal of the mixing circuit 6. An example of this output is shown in FIG. 4.

In the case where we want to increase such as rough contours as the lines forming the drawing, the index n of the transform characteristic curve of the nonlinear transform circuit 4 is increased and lines of intermediate level may be decreased, and on the contrary, if we want to increase lines of intermediate level, the index n may be decreased.

Moreover, if we want to show the drawing more clearly, the gain may be increased, and if we want to show the drawing lightly on the foundation, the gain may be decreased.

Anyway, the image transform device capable of forming the line drawing simply that agrees with the user's sensitivity can be realized.

Furthermore, regarding the works to give special effects as described above, since it is natural that the process of trial and error will be repeated again and again in order to obtain better results and it is important that the result of each parameter adjusted can be confirmed in real time, the most part of the image transform device 1 shown in this embodiment can achieve these tasks by means of simple hardwares such as a multiplier and an adder and moreover, the main part nonlinear transform unit can be realized by the ROM table, the device capable of processing in real time can be formed easily with low price. Thus, the device equipped with special effects which can be easily used for many users can be realized.

(2) Second Embodiment

Figure 5:
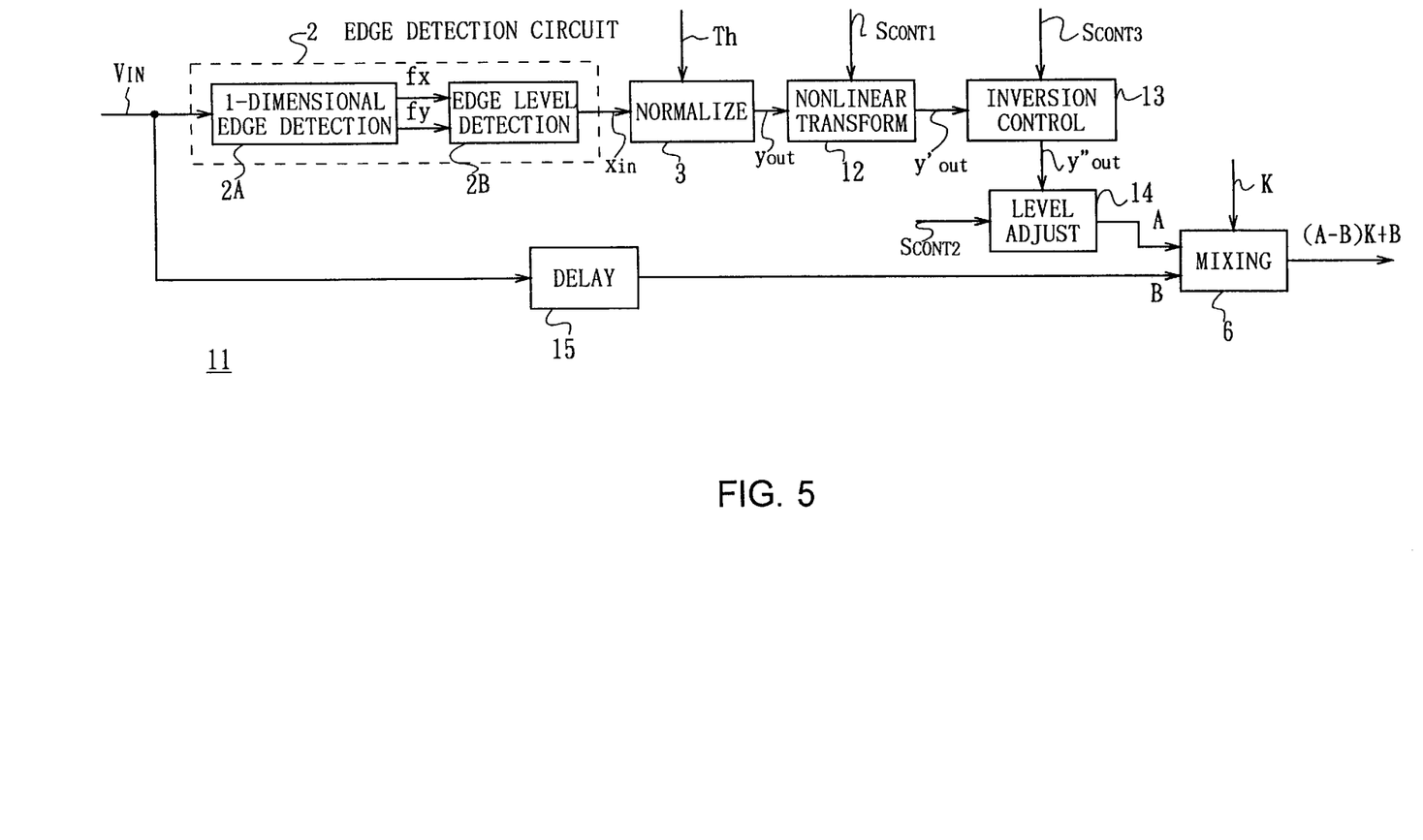
FIG. 5 is a block diagram showing one embodiment of the image transforming device according to the present invention.

In FIG. 5, in which the corresponding parts of FIG. 1 are given the same reference numerals, the construction of a image transform device which can be suitably applied to the case when transforming an original image to the painting style will be shown.

In an image transform device 11, the parts different from FIG. 1 will be described. In the case of this image transform device 11, the edge element A extracted from the input image f and the color element B of the input image f are mixed in the fixed proportion K at a mixing circuit 6 and will be outputted.

Figure 6A:
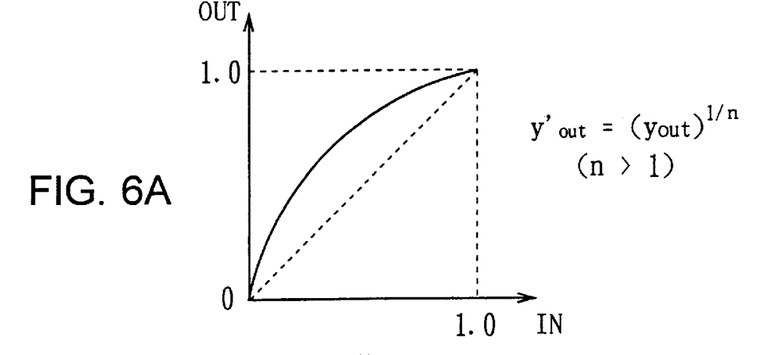
FIGS. 6A and 6B are characteristic curvilinear diagrams explaining the nonlinear transform characteristics and its reversed processing.

Firstly, a nonlinear transform circuit 12 placed at the latter stage of a normalization circuit 3 will be described. The direction of transform characteristic curve of nonlinear transform to be used in this picture transform is different from that of the drawing transform and an upward convex curve as shown in FIG. 6A will be used. This transform is the characteristic transform which shows the edge darker than the original edge and makes it possible that the darkness of lines become constant similar to that of the case where human being writes them. At this point, the transform curve to give the transform characteristic can be obtained by the following Equation:

$$y'_{out} = (y_{out})^{1/n} \ (\text{where } n > 1) \tag{6}$$

Figure 6B:
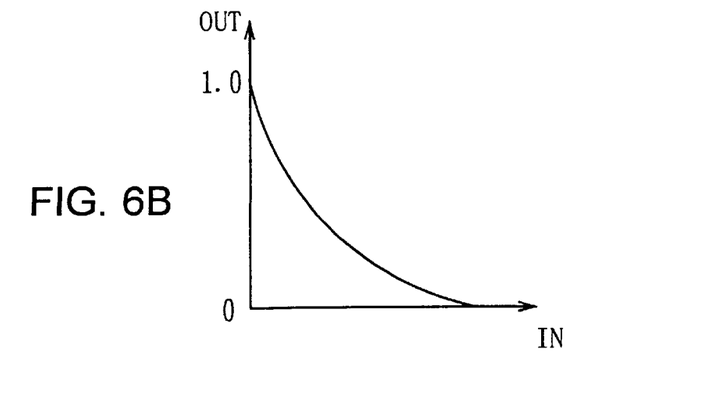

An inversion control circuit 13 is a circuit to reverse the lightness and darkness of the edge information which is characteristic transformed by the nonlinear transform circuit 12. The combined transform characteristic of the nonlinear transform circuit 12 and the inversion control circuit 13 can be expressed in FIG. 6B. The part having high brightness will be changed to the dark line by this inversion control.

A level adjustment circuit 14 is the circuit to determine the darkness of lines and the level of reversed output $Y''_{out}$ to be inputted from the inversion control circuit 13 will be determined by control signal $S_{CONT2}$.

A delay circuit 15 is a circuit to coincide the timing after the processing on the edge part is completed and to be inputted to the mixing circuit 6 and the timing that the input image f which is the original image, to be inputted to the mixing circuit 6.

On the Y (brightness) signal, the mixing circuit 6 shown in this embodiment mixes the first input signal A and the second input signal B and outputs it, and on the C (color) signal, adjusts the gain of the second input signal B and outputs it. In this connection, the mixture ratio K of the first input signal A and the second input signal B can be given externally. Thus, since the mixture ratio can be adjusted freely, the image can be transformed sequentially from the input image f itself to the image like painting from the output terminal of the mixing circuit 6.

Figure 7:
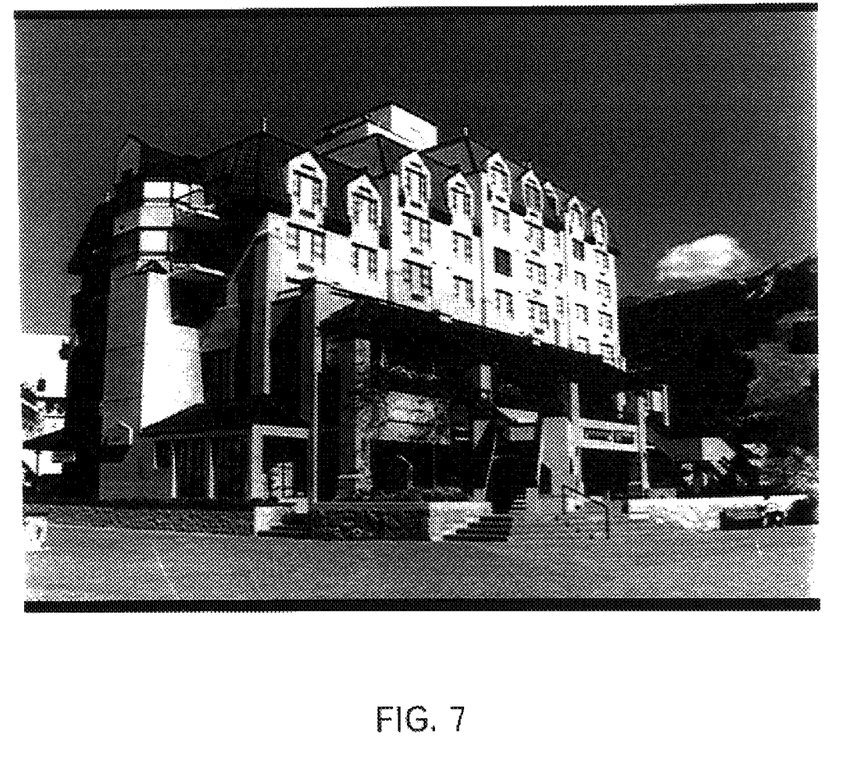
FIG. 7 is a picture showing an input image.

In the foregoing construction, an example of the image transform processing according to the image transform device 11 will be described below. Provided that the image of FIG. 7 will be inputted to the edge detection circuit 2 as an input image f.

Figure 8:
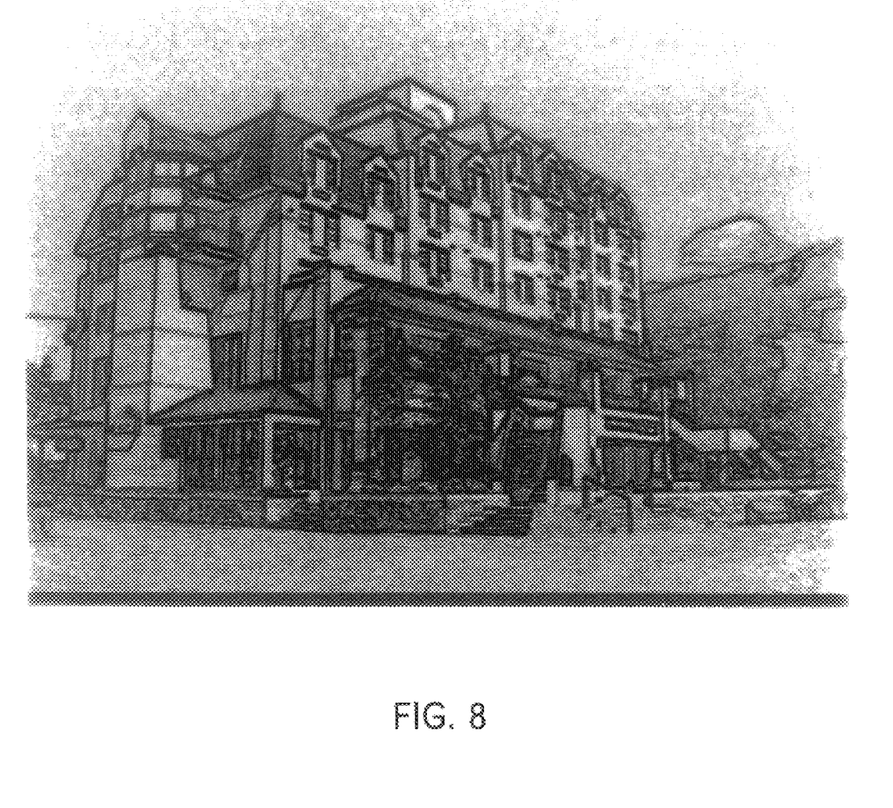
FIG. 8 is a picture showing an image after image transformed.

The image transform device 11, after completing each process of edge detection of the input image f, normalization, nonlinear transform and inversion control, transforms in order that the edge line is clearly visible dark (the first input signal A) and mixes this with the colored input image f (the second input signal B) delayed at the delay circuit 15 and outputs this from an output terminal. At this point, an image with a border of edge line which is clearly visible can be obtained from the output terminal as shown in FIG. 8.

Furthermore, in the case where we want to increase edge lines, the index n of the transform characteristic curve of the nonlinear transform circuit 12 may be increased, and on the other hand if we want to increase the lines which is a little more closer to the original image, the index n may be decreased.

Moreover, if we want to make the gray lines of the edge darker, the gain may be increased, and if we want to make it lighter, the gain may be decreased.

Furthermore, if we want to get an image like a painting of which edge lines are emphasized, the value of mixture rate K may be increased, and if we want to get an image closer to the input image f, the value of mixture rate K may be decreased. Anyway, the image transform device capable of forming the picture which agrees with the sensitivity of the user can be realized.

Furthermore, since the most part of the image transform device 11 can be realized by means of simple hardwares such as multiplier and adder, and the nonlinear transform unit which is the main part, can be formed with the ROM table, the device capable of executing the real time processing with the low price can be formed.

(3) Third Embodiment

Figure 9:
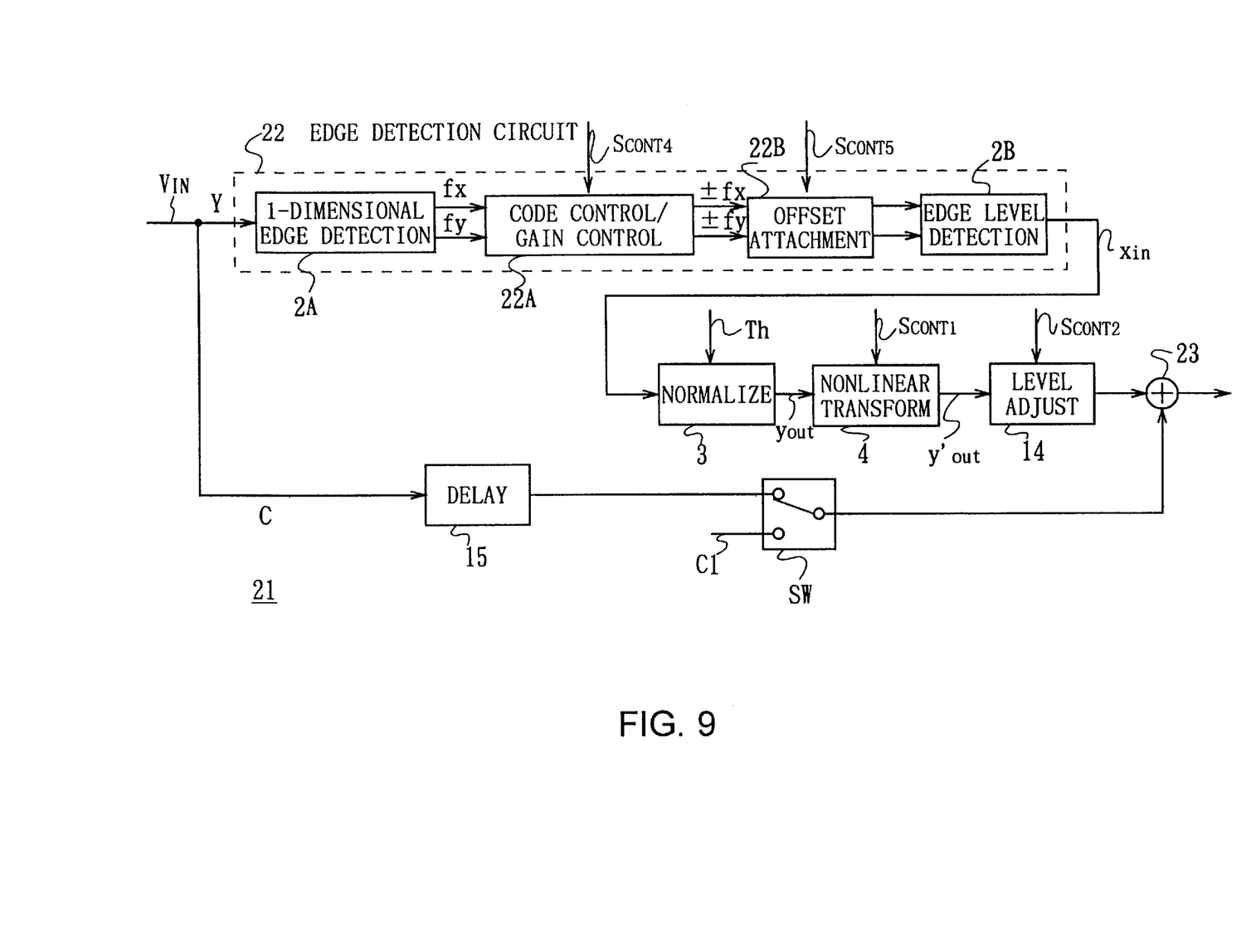
FIG. 9 is a block diagram showing one embodiment of the image transforming device according to the present invention.

In FIG. 9, in which corresponding parts of FIGS. 1 and 5 are designated the same reference numerals, an example of the construction of the image transform device which can be suitably used in the case of transforming an original image to a relief style will be shown.

Then, of each part of the image transform device 21, parts different from FIG. 5 will be described below. In the case of this image transform device 21, the circuit part for extracting the edge element of the input image f, i.e., an edge detection circuit 22, is characterized and the direction of light striking against the subject and the concave and convex relation of the surface of the subject can be freely changed.

A one dimensional edge detection circuit 2A and an edge level detection circuit 2B are provided in the input stage and in the output stage of the edge detection circuit 22 similar to the form of the embodiment described above. However, the edge detection circuit 22 of this embodiment is characterized by having a code control/gain control circuit 22A and an offset adding circuit 22B placed between the above two circuits.

At this point, the code control/gain control circuit 22A can freely control the codes of fx and fy to be inputted from the one dimensional edge detection circuit 2A at the former stage based on the control signal $S_{CONT4}$ from the outside.

Figure 10:
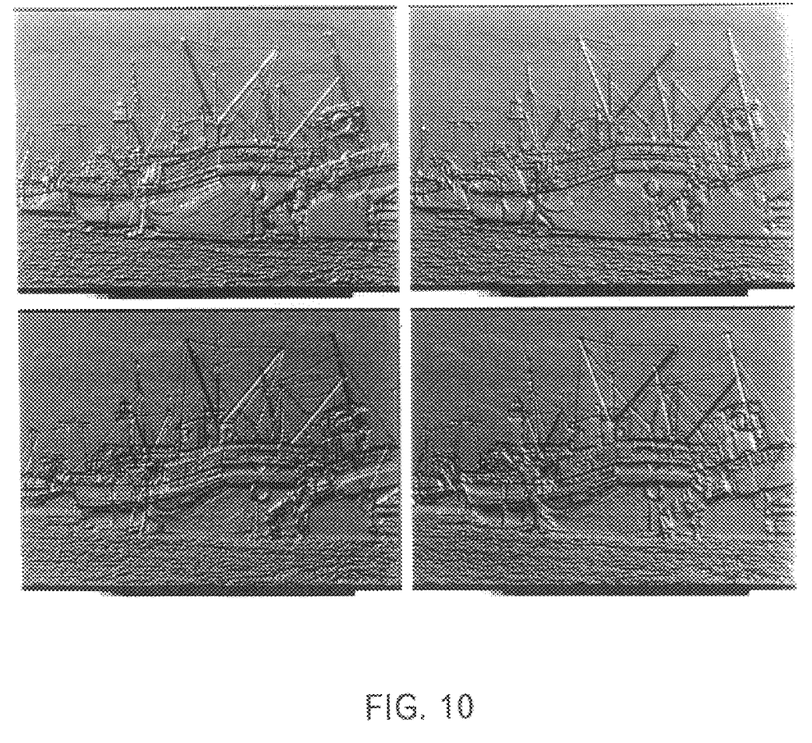
FIG. 10 is pictures showing images after relief transformed.

This will be described in utilizing FIG. 10. FIG. 10 shows an intermediate tone image which is to be obtained with respect to plus and minus combinations of codes of differential fx and fy wherein the input image f is differentiated in each direction in the case where the left upper image of FIG. 3 is inputted as the input image f. Here, the combination of (fx, fy) codes of the image at the left upper stage is (+, +), the combination of the image at the right upper stage is (−, +), the combination of the image at the left lower stage is (−, −) and the combination of the image at the right lower stage is (+, −), however, directions of lights and the concave-convex combination are different each other.

More specifically, in the code control/gain control circuit 22A, if fx code to give the edge of the horizontal direction is reversed, image pictures having opposite light direction can be formed like the relation between 2 images of the right side and the left side at the upper stage and the relation between 2 images of the right side and the left side at the lower stage. In this connection, the incident light to the left side image is injected from left to the right side while the incident light to the right side image is injected from right to the left side.

Furthermore, in the code control/gain control circuit 22A, if the combination of codes of fx to give the edge of horizontal direction and fy to give the edge of vertical direction were interchanged, such as (+, +)→(−, −) and (−, +)→(+, −), the images having the same light direction but the opposite concave-convex can be formed like the relationship between two images at the upper stage and the lower stage on the same side in FIG. 10.

Accordingly, by controlling the codes of fx and fy to give edges, four kinds of images having different visual effects can be freely interchanged. Also, in that case, if the weighting process would be conducted, their atmospheres can be set freely.

Figure 11A:
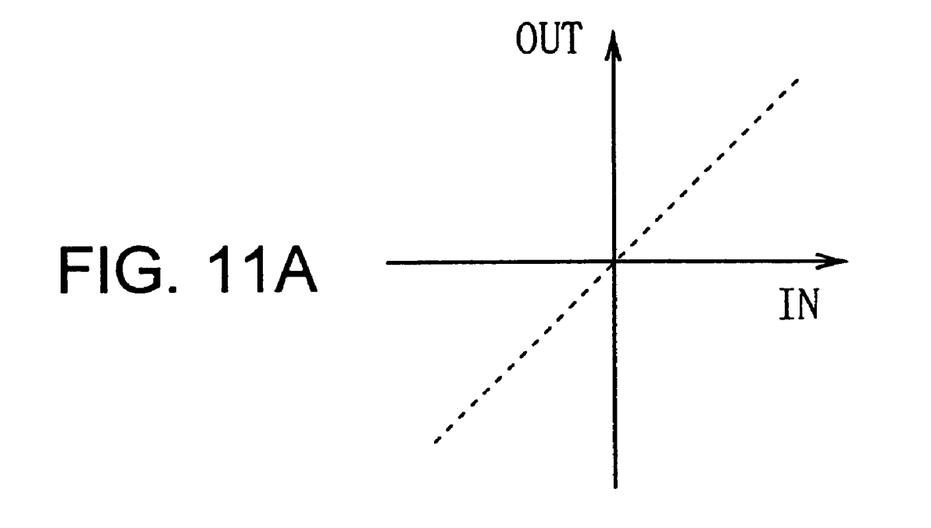
FIGS. 11A and 11B are schematic diagrams explaining the offset attaching.
Figure 11B:
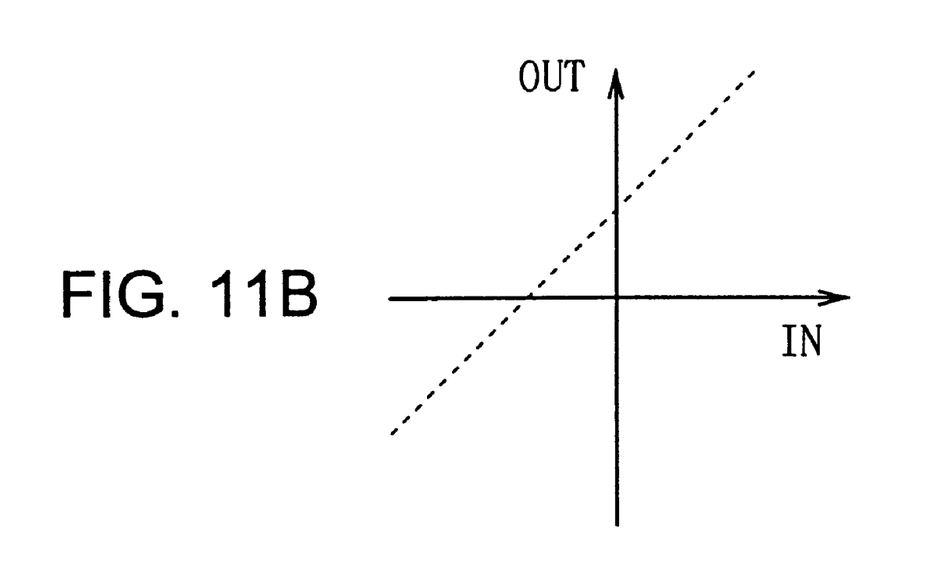

Next, the offset attaching circuit 22B will be described below. As shown in FIGS. 11A and 11B, the offset attaching circuit 22B is a circuit which can give an effect on the output as if the negative part (i.e., shade part) has the positive value (i.e., exposed to the sun) by giving an offset. The quantity of offset can be adjusted by the control signal $S_{CONT5}$ to be inputted externally.

After completing the above processing of the edge detection circuit 22, the image transform circuit 21 normalizes the signal and conducts the nonlinear transform and the level shift on it by the normalization circuit 3. In this connection, the nonlinear transform is conducted based on a characteristic curve shown in FIG. 2. According to this nonlinear transform and offset attachment before the nonlinear transform, it becomes possible to add a sense of metal glaze to the output image. That is to say, the very fine edge having high brightness can be obtained.

However, basically the other construction is the same as that of the image transform device 11 shown in FIG. 5. In the case of image transform device 21, by adjusting the level at the level adjusting circuit 14, the depth of roughness can be continuously adjusted.

More specifically, when the level is gradually increased, the image can be adjusted in order that its roughness becomes deeper such as the right upper image→the left bottom image→right bottom image shown in FIG. 3.

The image transform device 21 selects either one of color signals from a signal C of the input image f or an external input color signal C1 at the switch SW and adds said selected color signal at the adder 23 and outputs it.

With this arrangement, relief drawings can be added with colors of the input image and also can be colored with the color assigned by the external input color signal C1 and will be outputted.

According to the foregoing construction, an example of the image transform processing by the image transform device 21 will be described. At this point, the image shown on the left upper side of FIG. 3 will be inputted to the edge detection circuit 22 as an input image f.

The image transform device 21, after conducting each process of edge detection of the input image f, throughing the code and gain control, the offset attachment, the edge level detection, normalization, nonlinear transform and the level adjustment, adjusts the direction of light projecting to the subject, the direction of roughness, the strength of metal brightness, and the increase and decrease of the edge resolution, and the depth of roughness, and can easily obtain the relief picture having an atmosphere which coincides with the sensitivity of the user.

Moreover, as to the image transform device 21, since a great part of it can be constructed by simple hardwares such as a multiplier and an adder and its main part nonlinear transform unit can be realized by ROM table, the device capable of real time processing can be easily formed at a low price.

(4) Other Embodiments

In the embodiments described above, all image transform devices are constructed by multipliers and adders or ROM tables. However, the present invention is not only limited to these but also each processing of these image transform devices may be executed by the processing on the software.

Moreover, in the embodiment described above, the transfer characteristic curve to realize nonlinear transform by Equations (4) and (6) is provided. However, the present invention is not only limited to this but also the brightness may be changed by using the other nonlinear curve.

Furthermore, in the embodiment described above, Abel's operator is as an example of differential operator. However, the present invention is not only limited to this but also an operator to be given by the following Equation may be used.

$$fx = \begin{pmatrix} -1 & 0 & 1 \\ -1 & 0 & 1 \\ -1 & 0 & 1 \end{pmatrix} fy = \begin{pmatrix} -1 & -1 & -1 \\ 0 & 0 & 0 \\ 1 & 1 & 1 \end{pmatrix} \quad (7)$$

Moreover, in the embodiments described above, the device is realized as the special devices equipped with specific effects. However, the present invention is not only limited to this but also it can be widely applied to the device having all or combined functions corresponding to the circuits shown in FIGS. 1, 5 and 9.

According to the present invention as described above, since the edge signal of the input image detected by the edge detection means is normalized by the normalization means and furthermore, in order to decrease the intermediate tone elements two signals are mixed making the nonlinear transformed edge signal as a key signal, the image transform device which is capable of obtaining the drawing style image in which edges having high light and shade contrast are extracted from the inputted signal by real time can be realized.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An image transforming device comprising:

edge detecting means for detecting edges of an inputted image;

normalizing means for normalizing and outputting edge signals detected by said edge detecting means;

nonlinear transforming means for receiving the normalized edge signals and for nonlinear transforming the received normalized edge signals in accordance with a predetermined relationship in order to increase intermediate tone elements thereof, in which the predetermined relationship is expressed by $y_{out}=(y_{in})^{1/n}$ wherein $y_{out}$ represents the nonlinear transformed edge signal, $y_{in}$ represents the received normalized edge signals, and n>1;

inverting means for inverting the light and shade of said nonlinear transformed edge signal and outputting the inverted edge signal; and mixing means for receiving mixing ratio information, said inverted edge signal, and said inputted image and for mixing a difference of said inverted edge signal and said inputted image, weighting said difference by the mixing ratio information, and adding the inputted image to the weighted difference to transform the inputted image to a painting style image.

2. The image transforming device according to claim 1, wherein the value of said mixing ratio information can be adjusted by an external control.

3. The image transforming device according to claim 1, wherein processings according to said edge detecting means, said normalization means, said nonlinear transforming means, said inverting means and said mixing means are realized by means of computing processing on softwares.

* * * * *